United States Patent [19]
Luster

[11] Patent Number: 5,975,710
[45] Date of Patent: Nov. 2, 1999

[54] OPTICAL IMAGE FIELD SPLITTING SYSTEM

[76] Inventor: Spencer D. Luster, 3207 Algonquin Parkway, Toledo, Ohio 43606

[21] Appl. No.: 09/134,658

[22] Filed: Aug. 14, 1998

[51] Int. Cl.[6] .............................. G02B 5/08; G02B 5/10; G02B 17/00

[52] U.S. Cl. .......................... 359/856; 359/857; 359/861; 359/864; 359/364; 359/365

[58] Field of Search ..................................... 359/856, 857, 359/861, 864, 840, 872, 873, 364, 365; 248/476, 477; 348/43, 49, 51; 358/225, 229, 87

[56] References Cited

U.S. PATENT DOCUMENTS

| | | | |
|---|---|---|---|
| 2,167,657 | 8/1939 | Karnes ..................................... | 359/861 |
| 3,937,556 | 2/1976 | Newell . | |
| 4,167,756 | 9/1979 | Smith . | |
| 4,174,154 | 11/1979 | Kawasaki ................................. | 359/857 |
| 4,227,776 | 10/1980 | Morton et al. ........................... | 359/857 |
| 4,457,599 | 7/1984 | Sawicki ..................................... | 352/89 |
| 5,856,888 | 1/1999 | Ross et al. ................................ | 359/857 |

*Primary Examiner*—Cassandra Spyrou
*Assistant Examiner*—Mohammad Y. Sikder
*Attorney, Agent, or Firm*—Donald R. Fraser

[57] ABSTRACT

An optical image field splitting system which is adapted to allow a single camera to be used to view two or more images or object scenes of a single object or one or more images from a plurality of objects is disclosed. The optical image field splitting system includes a camera, a mirror pair, a lens, and a third mirror spaced apart from the mirror pair. The mirror pair includes a first mirror defining a first reflective planar surface and a second mirror defining a second reflective planar surface. The first reflective planar surface is oriented at a first predetermined angle relative to the second reflective planar surface. The lens is coupled to the camera and disposed in an optical path defined between the camera and the mirror pair. The third mirror defines a third reflective planar surface oriented at a second predetermined angle relative to the second reflective surface of the second mirror. An optical path length is defined between the third mirror and the second mirror. The third mirror is selectively rotatable relative to the second mirror without changing the first optical path length.

1 Claim, 5 Drawing Sheets

OPTICAL IMAGE FIELD SPLITTING SYSTEM

BACKGROUND OF THE INVENTION

The present invention relates in general to optical imaging systems and in particular to an optical imaging field splitting system adapted to simultaneously and adjustably view two or more different images or object scenes and/or to simultaneously view the same image from two or more different angles.

A typical prior art optical image field splitting system uses some form of standard beam splitters to provide views of two or more images or object scenes superimposed on the same area of a single image plane. It is an inherent property of such prior art systems that each image will obscure or interfere with the other images. In order to circumvent this problem, prior art optical image field splitting systems use some mechanism for allowing projection of only a single view at a time onto the image plane. Methods of accomplishing such a result are many and varied. Typically, these methods include alternating shutters, mechanical scanning of a mirror or mirrors, and polarization state changing electro-optic devices. In any case, these methods do not allow a true simultaneous view since there is some finite time interval between the alternate views. This can have important consequences, particularly when comparing or inspecting rapidly changing but different scenes.

Additionally, prior art optical image field splitting systems typically do not allow for adjustment of the direction or position of the images or object scenes without changing the optical path length of the imaging system. Such a path length change inherently changes the system magnification and degree of image focus unless otherwise corrected. Another problem with prior art optical image field splitting systems that allow adjustment of the direction of the object scenes is the reduction of the angular field of view due to the reduced useable area of the field splitting mirror. Such a problem is illustrated in the optical image field splitting system described and illustrated in U.S. Pat. No. 4,167,756 to Smith.

SUMMARY OF THE INVENTION

The present invention relates to an optical image field splitting system which is adapted to allow a single camera to be used to view two or more images or object scenes of a single object or one or more images from a plurality of objects. The optical image field splitting system includes a camera, a mirror pair, a lens, and a third mirror spaced apart from the mirror pair. The mirror pair includes a first mirror defining a first reflective planar surface and a second mirror defining a second reflective planar surface. The first reflective planar surface is oriented at a first predetermined angle relative to the second reflective planar surface. The lens is coupled to the camera and disposed in an optical path defined between the camera and the mirror pair. The third mirror defines a third reflective planar surface oriented at a second predetermined angle relative to the second reflective surface of the second mirror. An optical path length is defined between the third mirror and the second mirror. The third mirror is selectively rotatable relative to the second mirror without changing the first optical path length.

The optical image field splitting system of this invention may include a photographic camera, electronic video surveillance or "camcorder" type camera, or an electronic camera or sensor that is part of a machine vision system. Such a capability can have artistic value, allowing one to compose otherwise "impossible" shots of two or more different object scenes appearing simultaneously on the same image plane. The optical image field splitting system of this invention also has utility for video conferencing when two or more people or objects should be imaged onto a single camera detector even though they are spatially separated by a large distance. In terms of machine vision or sensor systems, such a capability allows a single detector to perform various functions, such as for example, inspection or measurement on multiple different fields, thus saving the cost of multiple detectors and the associated hardware as well as providing higher resolution than would otherwise be possible for a single detector performing the same task. One advantage of the optical image field splitting system of this invention is that it allows infinite adjustment of the position and direction of the desired images or object scenes, and that it allows infinite adjustment of the position and direction of the desired object scenes without altering the angular field of view of any scene.

Other objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
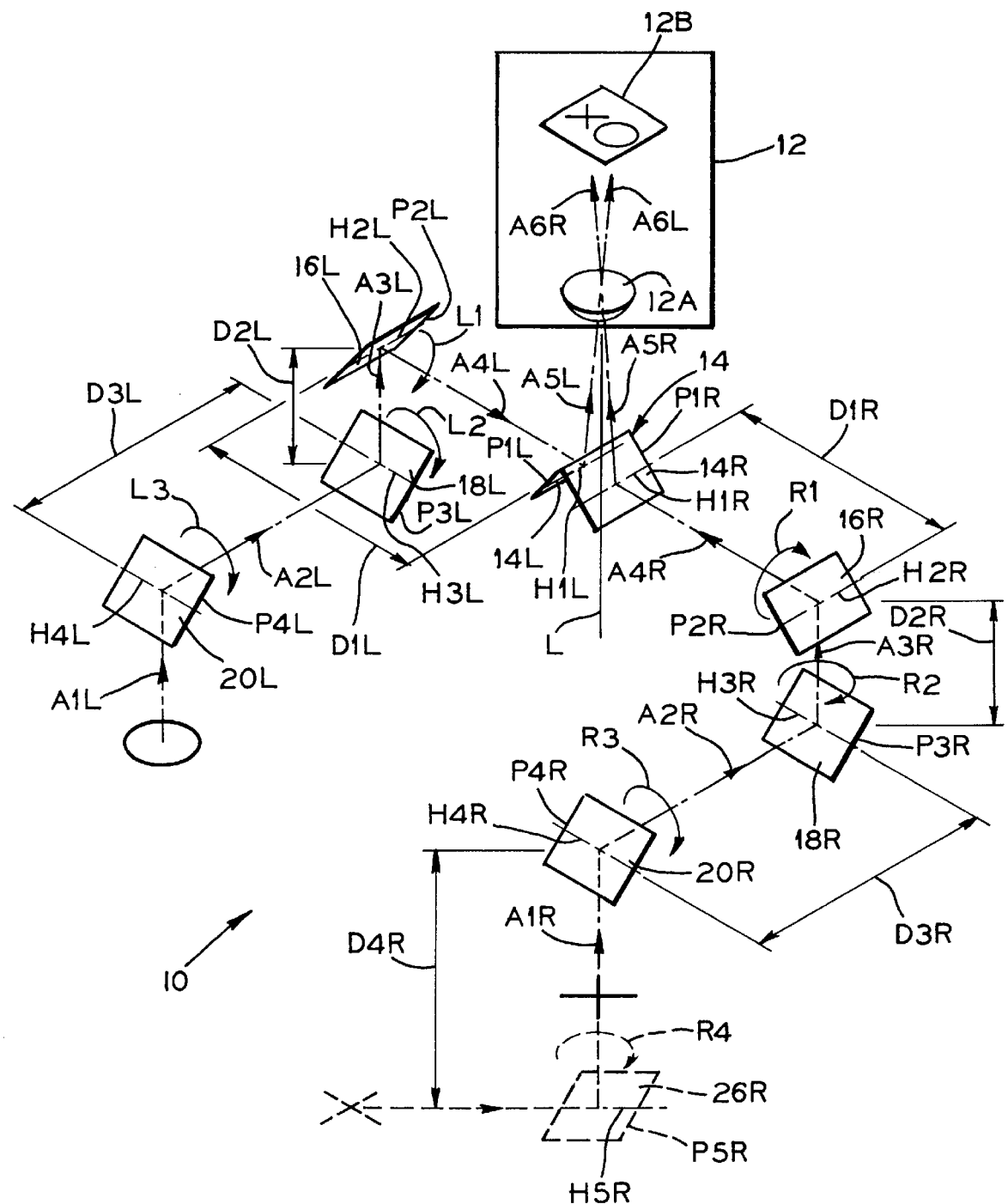
FIG. 1 is a schematic diagram illustrating of a first embodiment of an optical image field splitting system in accordance with the present invention.

Referring now to FIG. 1, there is illustrated a first embodiment of an optical image field splitting system, indicated generally at 10, in accordance with the present invention. As shown therein, the optical image field splitting system 10 is an adjustable multi-view optical image field splitting system and includes a camera 12, mirrors 14R and 14L, 16R and 16L, 18R and 18L, 20R and 20L, and a pair of objects "O" and "X". The camera 12 includes a lens 12A and defines an image plane 12B. The camera 12 can be any kind of a suitable type of camera, such as for example, a photographic camera, an electronic video surveillance or "camcorder" type camera, and an electronic camera or sensor that is part of a machine vision system.

In the illustrated embodiment, mirrors 14R, 16R, 18R, and 20R cooperate to define a "right" hand optical mirror chain or array of the optical image field splitting system 10, and mirrors 14L, 16L, 18L, and 20L cooperate to define a "left" hand optical mirror chain of the optical image field splitting system 10. In the illustrated embodiment, the right hand mirror chain and the left hand mirror chain include the same number of mirrors. However, the number of mirrors in the associated optical mirror chains can be other than illustrated if desired.

The mirror 14R defines a mirror plane P1R and a horizontal axis H1R, the mirror 16R defines a mirror plane P2R and a horizontal axis H2R, the mirror 18R defines a mirror plane P3R and a horizontal axis H3R, and the mirror 20R defines a mirror plane P4R and a horizontal axis H4R. Similarly, the mirror 14L defines a mirror plane P1L and a horizontal axis H1L, the mirror 16L defines a mirror plane P2L and a horizontal axis H2L, the mirror 18L defines a mirror plane P3L and a horizontal axis H3L, and the mirror 20L defines a mirror plane P4L and a horizontal axis H4L.

In the illustrated embodiment, the mirror planes P1R and P1L of the mirrors 14R and 14L, respectively, are oriented generally perpendicular to each other and generally at 45 degrees relative to an optical axis L of the lens 12A of the camera 12 so as to define an orthogonal mirror pair 14 which is positioned in front of the lens 12A of the camera 12. The mirror planes P1R and P2R of the respective mirrors 14R and 16R are oriented generally parallel to each other, the mirror planes P2R and P3R of the respective mirrors 16R and 18R intersect each other, and the mirror planes P3R and P4R of the respective mirrors 18R and 20R are oriented generally parallel to each other. Similarly, the mirror planes P1L and P2L of the respective mirrors 14L and 16L are oriented generally parallel to each other, the mirror planes P2L and P3L of the respective mirrors 16L and 18L intersect each other, and the mirror planes P3L and P4L of the respective mirrors 18L and 20L are oriented generally parallel to each other. However, the construction and/or the orientation of one or both of the mirrors 14R and 14L can be other than illustrated if desired, and/or the construction and/or the orientation of one or more of the mirrors 16R, 16L, 18R, 18L, 20R, and 20L can be other than illustrated if desired.

The distance between the mirrors 14R and 16R defines an optical path length D1R; the distance between the mirrors 16R and 18R defines an optical path length D2R; and the distance between the mirrors 18R and 20R defines an optical path length D3R. The distance between the mirrors 14L and 16L defines an optical path length D1L; the distance between the mirrors 16L and 18L defines an optical path length D2L; and the distance between the mirrors 18L and 20L defines an optical path length D3L. In the illustrated embodiment, the optical length D1R is the same as the optical length D1L; the optical length D2R is the same as the optical length D2L; and the optical length D3R is the same as the optical length D3L. However, one or more of the optical lengths D1R, D1L, D2R, D2L, D3R, and D3L can be other than illustrated if desired.

The position of one or more of the associated mirrors of the optical image field splitting system 10 can be adjusted. To accomplish such adjustment, the mirror 16R is rotatable about an axis R1; the mirror 18R is rotatable about an axis R2; and the mirror 20R is rotatable about an axis R3. Thus, an individual mirror 16R, 18R, and 20R or a group of mirrors 16R and 18R, 18R and 20R, and 16R, 18R, and 20R may be rotated about the respective associated axis R1, R2, and R3 that proceeds it toward the lens 12A. For example, the mirror group 16R, 18R, and 20R may be rotated as a group about axis R1; the mirror group 18R and 20R may be rotated about axis R2; and the mirror 20R may be rotated about axis R3. Similarly, the mirror 16L is rotatable about an axis L1; the mirror 18L is rotatable about an axis L2; and the mirror 20L is rotatable about an axis L3. Thus, an individual mirror 16L, 18L, and 20L or a group of mirrors 16L and 18L, 18L and 20L, and 16L, 18L, and 20L can be rotated about the respective associated axis L1, L2, and L3 that proceeds it toward the lens 12A. As a result, the direction and position of the associated viewing fields of the optical image field splitting system 10 may be infinitely adjusted over the base range of the optical chain with no change in the optical path length or the angular field of view. The selective rotation of the associated mirrors may be accomplished by utilization of conventional couplers. One of such couplers would include at least two coupler components provided with cooperating threaded end portions. The components may be rotated relative to one another about the central axis of the coupler. Since the thread pitch of the coupler is small, rotation of the components of less than or equal to 360 degrees will not introduce a significant change to the respective optical path length. Another useful coupler includes an intermediate right circular cylindrical coupler element having annular grooves formed in the outer surface at each end thereof. The ends of the intermediate element are telescopingly received within a block element containing a mirror and an extension tube, for example. Set screws may be used to enable selective rotation and, upon tightening, may be used to prevent relative rotation. Other methods for effecting rotation are also possible. Other methods include inter-sliding sleeves with set screw or clamp locking or, with less flexibility, detented sleeves of cylindrical couplers which allow fixed angle changes which are repeatable. The reason for the constant optical path length and angular field of view is because rotation about one of the axes R1, R2, R3 and L1, L2, L3 does not change the associated optical length D1R, D2R, D3R and D1L, D2L, D3L between any pair of respective adjacent mirrors 14R and 16R, 16R and 18R, 18R and 20R; and 14L and 16L, 16L and 18L, 18L and 20L. Thus, since there is no change in distance of any component of the optical path, the total optical path length will not be changed either. Also, the angle between any rotation axis and any mirror adjacent to it does not change. Thus, there is no change to the angular field of view of the optical image field splitting system 10.

The optical image field splitting system 10 operates in the following manner. Assume a ray of light (not shown) is directed downwardly from the camera 12 or other suitable light source parallel to the optical axis L of the lens 12A and strikes the mirror pair 14. The ray of light is reflected from the mirror 14R and travels horizontally and strikes the mirror 16R. Since the mirror 16R is parallel to the mirror 14R, the ray of light is directed downwardly generally parallel to the optical axis L of the lens 12A where it strikes mirror 18R. The ray of light reflected by mirror 18R travels horizontally and strikes mirror 20R. Since the mirror 20R is parallel to the mirror 18R, the ray of light is directed downwardly generally parallel to the optical axis L of the lens 12A where it strikes the object X. At the same time, the ray of light is reflected from the mirror 14L and travels horizontally and strikes the mirror 16L. Since the mirror 16R is parallel to the mirror 14L, the ray of light is directed downwardly generally parallel to the optical axis L of the lens 12A where it strikes mirror 18L. The ray of light reflected by mirror 18L travels horizontally and strikes mirror 20L. Since the mirror 20L is parallel to the mirror 18L, the ray of light is directed downwardly generally parallel to the optical axis L of the lens 12A where it strikes the object O. As a result, the associated images from the objects X and O are reflected via the associated mirrors and pass through the lens 12A and are displayed on the image plane 12B of the camera 12 (the path of the reflection of the images for the objects X and O are indicated by respective arrows A1R–A6R and A1L–A6L in FIG. 1). Depending upon the particular application including the camera 12 and the camera lens 12A, the number, construction, and arrangement of the associated mirrors and the optical path lengths defined between such mirrors are selected to produce a desired image "magnification" on the image plane of the system.

Alternatively, one or more additional mirrors can be added to or removed from the right hand mirror chain and/or the left hand mirror chain of the optical image field splitting system 10 of this invention. For example, the mirrors 18R, 20R, 18L, and 20L can be removed, or an additional mirror 26R can be added. The mirror 26R defines a mirror plane P5R and a horizontal axis H5R, and an optical path length D4R between itself and mirror 20R, and is rotatable about an axis R4. Preferably, the addition or removal of any mirrors is done in such a way so that the right hand mirror chain and the left hand mirror chain include the same number of mirrors. However, the number of mirrors used in the particular optical image field splitting system will depend upon the particular application.

Figure 2:
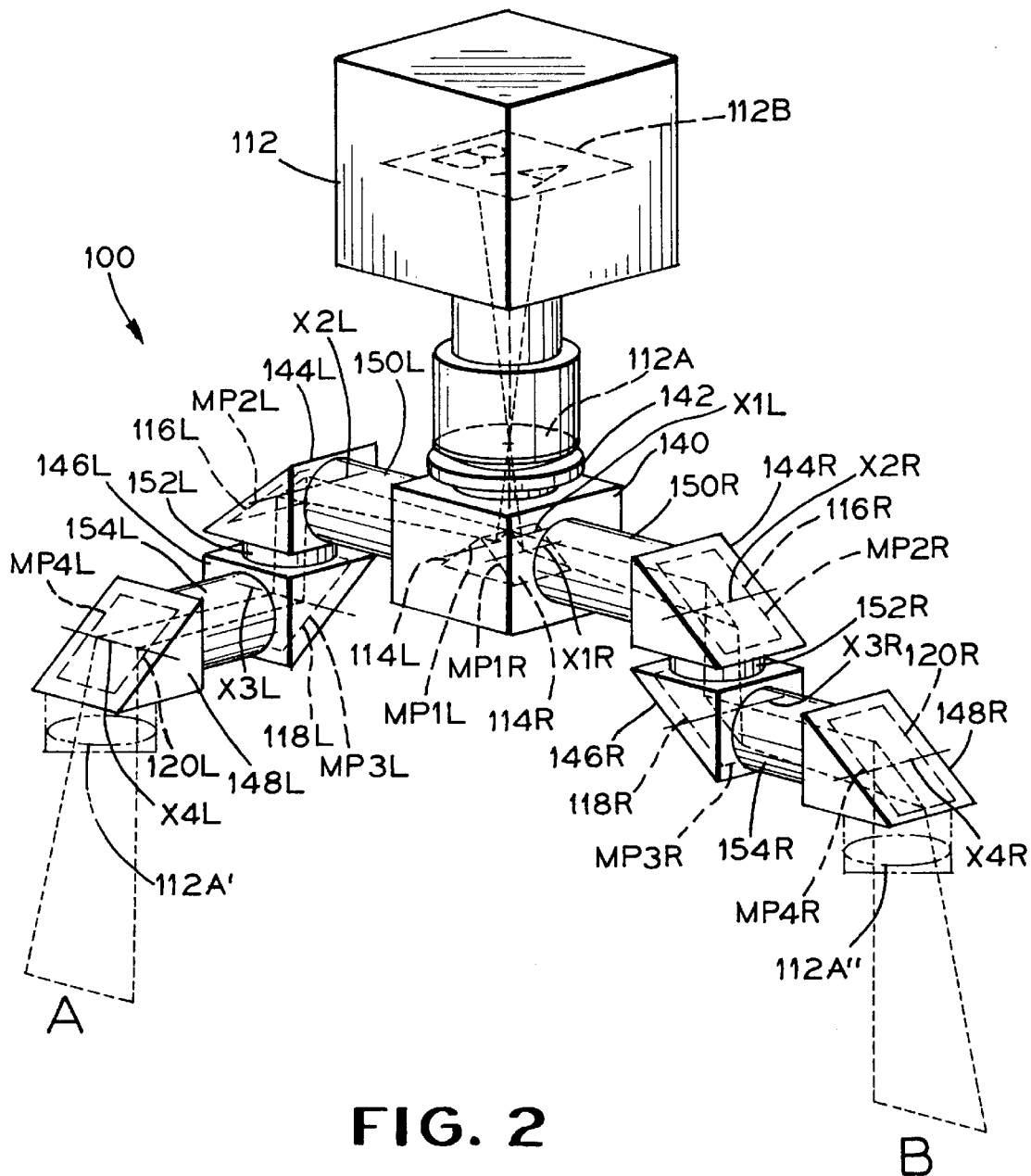
FIG. 2 is a perspective view of a second embodiment of an optical image field splitting system in accordance with this invention.

Referring now to FIG. 2, there is illustrated a second embodiment of an optical image field splitting system, indicated generally at 100, in accordance with the present invention. As shown therein, the optical image field splitting system 100 is an adjustable multi-view optical image field splitting system and includes a camera 112, mirrors 114R and 114L, 116R and 116L, 118R and 118L, 120R and 120L, and a pair of objects "A" and "B". The camera 112 includes a lens 112A and defines an image plane 112B. The camera 112 can be a suitable type of camera, such as for example, a photographic camera, an electronic video surveillance or "camcorder" type camera, and an electronic camera or sensor that is part of a machine vision system. The camera 112 and mirrors 114R, 114L, 116R, 116L, 118R, 118L, 120R and 120L are supported by suitable means (not shown).

In the illustrated embodiment, mirrors 114R, 116R, 118R, and 120R cooperate to define a "right" hand optical mirror chain or array of the optical image field splitting system 100; and mirrors 114L, 116L, 118L, and 120L cooperate to define a "left" hand optical mirror chain of the optical image field splitting system 100. Preferably, the right hand mirror chain and the left hand mirror chain include the same number of mirrors. However, the number of mirrors can be other than illustrated if desired.

The mirrors 114R and 114L are disposed in a housing 140 which is connected to the lens 112A via an adapter 142. The adapter 142 allows different lenses and/or different cameras to be easily interchanged in the system. The mirror 116R is disposed in a housing 144R; the mirror 118R is disposed in a housing 146R; and the mirror 120R is disposed in a housing 148R. In the illustrated embodiment, the housing 144R is coupled to the housing 140 by a tubular extension member 150R; the housing 146R is coupled to the housing 144R by a tubular extension member 152R having a rotary joint; and the housing 148R is coupled to the housing 146R by a tubular extension member 154R. Similarly, the mirror 116L is disposed in a housing 144L; the mirror 118L is disposed in a housing 146L; and the mirror 120L is disposed in a housing 148L. The housing 144L is coupled to the housing 120 by an tubular extension member 150L; the housing 146L is coupled to the housing 144L by a tubular extension member 152L having a rotary joint; and the housing 148L is coupled to the housing 146L by a tubular extension member 154L. Preferably, a rotary joint (not shown) is also provided at the associated ends of each of the tubular extension members 150R and 150L, and 154R and 154L. Thus, the rotary joints allow angular adjustment of one or more of the mirrors 116R, 116L, 118R, 118L, 120R and 120L if desired, and the tubular extension members 150R, 150L, 152R, 152L, 154R and 154L provide a convenient way to change the optical path length between the associated mirrors by varying the length of one or more of the members. Alternatively, the construction of one or more of the tubular members 150R, 150L, 152R, 152L, 154R and 154L can be other than illustrated. For example, one or more of the tubular members 150R, 150L, 152R, 152L, 154R and 154L could be non-tubular and/or could be non-extendible and/or could be non-adjustable.

The mirror 114R defines a mirror plane MP1R and a horizontal axis X1R; the mirror 116R defines a mirror plane MP2R and a horizontal axis X2R; the mirror 118R defines a mirror plane MP3R and a horizontal axis X3R; and the mirror 120R defines a mirror plane MP4R and a horizontal axis X4R. Similarly, the mirror 114L defines a mirror plane MP1L and a horizontal axis X1L; the mirror 116L defines a mirror plane MP2L and a horizontal axis X2L; the mirror 118L defines a mirror plane MP3L and a horizontal axis X3L; and the mirror 120L defines a mirror plane MP4L and a horizontal axis X4L. The mirrors I 14R and 114L cooperate to define a mirror pair 114 which is placed in front of the lens 112A of the camera 112.

The mirror planes MP1R and MP1L of the mirrors 114R and 114L, respectively, are oriented generally perpendicular to each other and generally at 45 degrees relative to an optical axis L1 of the lens 112A of the camera 112. The mirror planes MP1R and MP2R of the respective mirrors 114R and 116R are oriented generally parallel to each other, the mirror planes MP2R and MP3R of the respective mirrors 116R and 118R are oriented generally parallel to each other, and the mirror planes MP3R and MP4R of the respective mirrors 118R and 120R are oriented generally parallel to each other. Similarly, the mirror planes MP1L and MP2L of the respective mirrors 114L and 116L are oriented generally parallel to each other; the mirror planes MP2L and MP3L of the respective mirrors 116L and 118L intersect each other; and the mirror planes MP3L and MP4L of the respective mirrors 118L and 120L are oriented generally parallel to each other. However, the orientation of one or both of the mirrors 114R and 114L can be other than illustrated if desired, and/or the orientation of one or more of the mirrors 116R, 116L, 118R, 118L, 120R, and 120L can be other than illustrated if desired. The operation of the optical image field splitting system 100 is similar to that discussed above in connection with the optical image field splitting system 10 illustrated in FIG. 1. Thus, the direction and position of the associated viewing fields of the optical image field splitting system 100 may be infinitely adjusted over the base range of the optical chain with no change in the optical path length or the angular field of view thereof. Alternatively, instead of the lens 112A being coupled to the camera 112, the optical image field splitting system 100 can include a lens 112A' and 112A" (shown in phantom in FIG. 2), at each end of the respective optical chains. Such an arrangement is suitable for high magnification applications.

Figure 3:
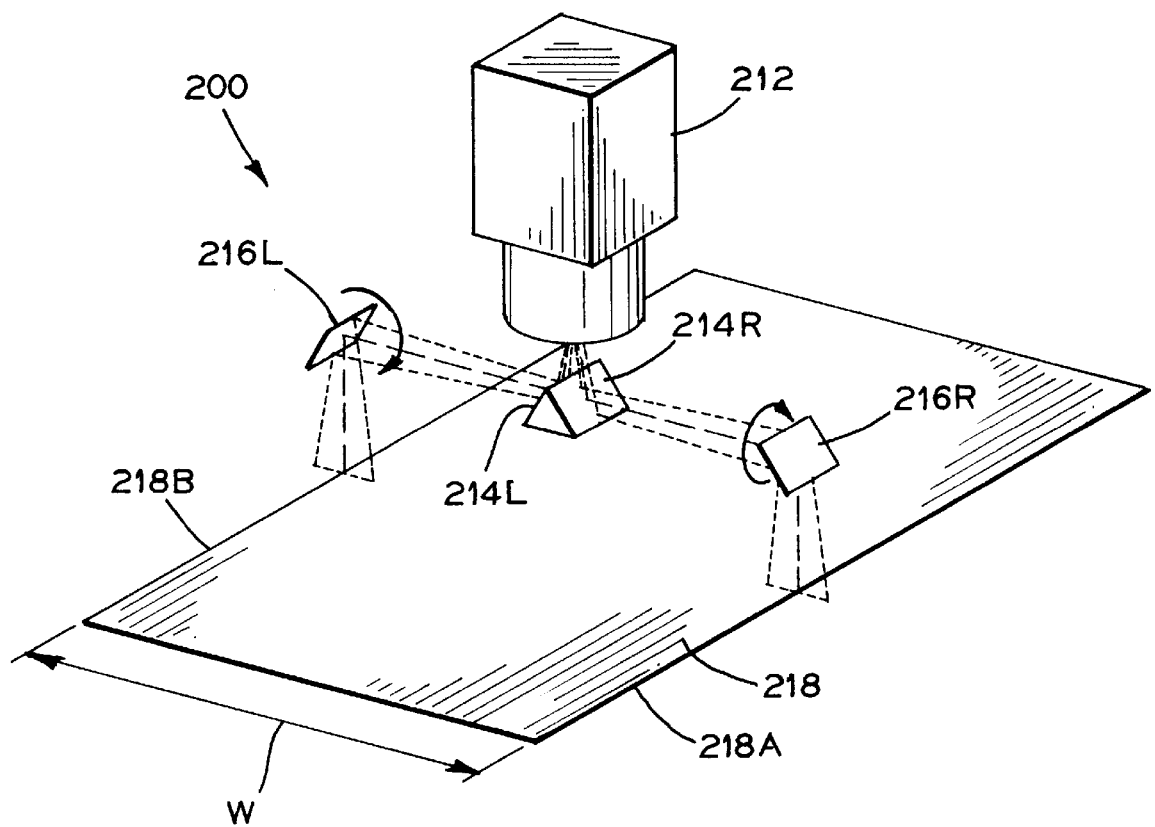
FIG. 3 is a schematic diagram illustrating a third embodiment of an optical image field splitting system in accordance with this invention, the system being used in connection with a machine vision application.

Referring now to FIG. 3, there is illustrated a third embodiment of an optical image field splitting system, indicated generally at 200, in accordance with the present invention. As shown therein, the optical image field splitting system 200 is an adjustable multi-view optical image field splitting system 200 and includes a camera 212, mirrors 214R and 214L and 216R and 216L, and an object 218. In the illustrated embodiment, the optical image field splitting system 200 is adapted for use in an optical gauging application, such as for example, in a machine vision application, where it is desired to simultaneously view both edges of the object 218. In the illustrated embodiment, the object 218 is a web of material, such as for example, a sheet/roll of paper, sheet metal, or textile web. However, the object 218 can be other than illustrated.

The optical image field splitting system 200 allows a single camera 212 to make a high resolution inspection of both edges 218A and 218B of the object 218. Thus, the optical image field splitting system 200 can be used check that the object 218 meets predetermined specifications, such as for example, that the object 218 has a uniform width W. Prior art methods required either two cameras, one dedicated to each edge of the object, or a single camera with a field of view large enough to see both edges of the object. The latter case results in reduced spatial resolution because the fixed number of pixels of the camera detector must be projected over a much larger area.

Figure 4:
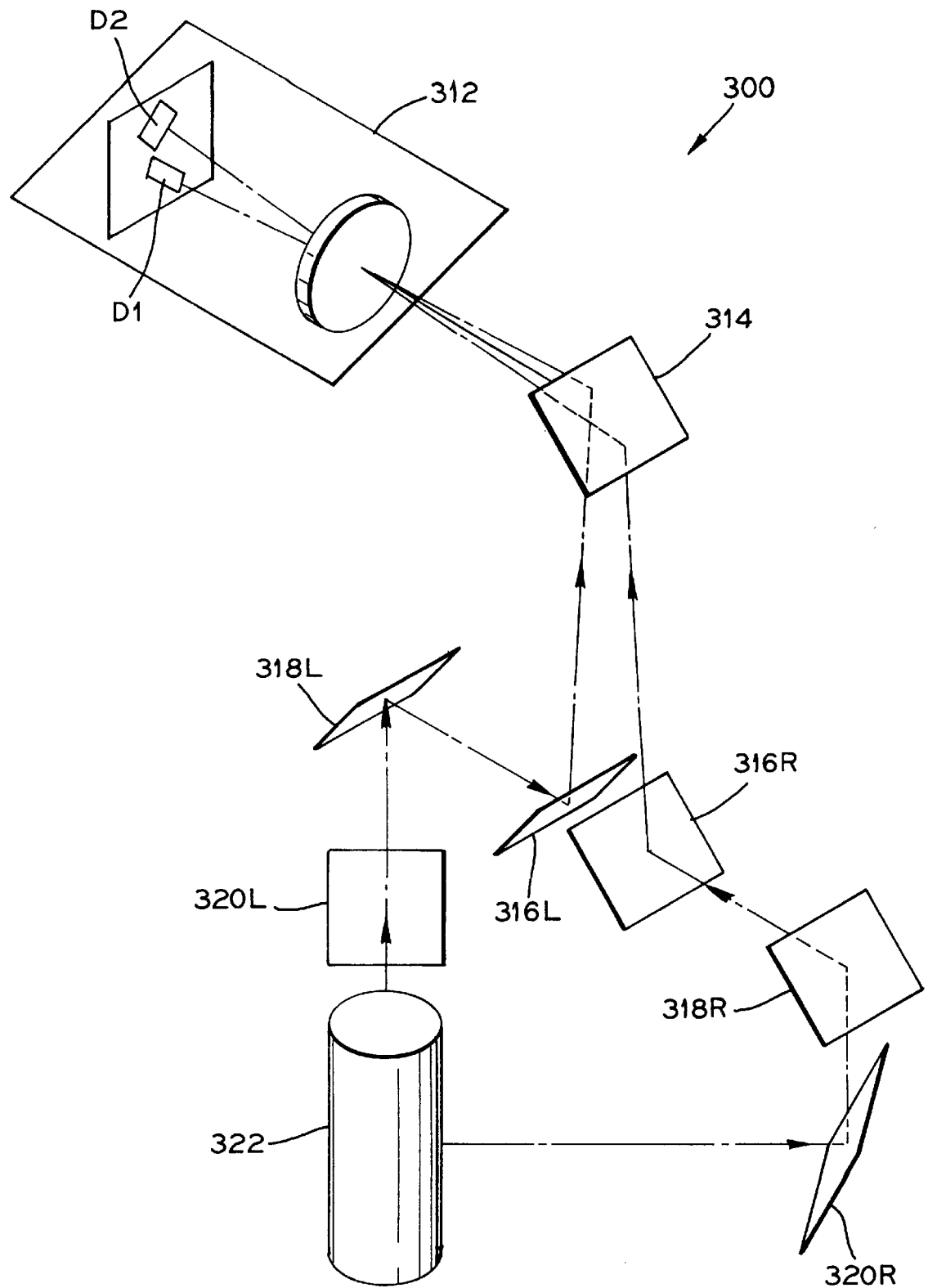
FIG. 4 is a schematic diagram illustrating a fourth embodiment of an optical image field splitting system in accordance with this invention, the system being used to view a single object from two different angles simultaneously.

Referring now to FIG. 4, there is illustrated a fourth embodiment of an optical image field splitting system, indicated generally at 300, in accordance with the present invention. As shown therein, the optical image field splitting system 300 is an adjustable multi-view optical image field splitting system 300 system includes a camera 312, mirrors 314, 316R, 316L, 318R, 318L, 320R and 320L, and an object 320. In this embodiment, the "single" mirror 314 is positioned in front of the lens of the camera 312 as opposed to the mirror pair 14, 114, 214R and 214L shown in respective FIGS. 1, 2, and 3; and the mirrors 316R and 316L are spaced apart from each other as opposed to the "coupled" mirror pair 14, 114, 214R and 214L shown in respective FIGS. 1, 2, and 3.

In the illustrated embodiment, the optical image field splitting system 300 is adapted for use in an optical gauging application, such as for example, in a machine vision application, where it is desired to view a single object 320 from two different preselected angles or points of view. In the illustrated embodiment, the object 320 is a cylindrical member, such as for example, a cylindrical tube. However, the shape of the object 320 can be other than illustrated. The optical image field splitting system 300 allows a single camera 312 to make a high resolution inspection of the object 320 from two different angles to check that the object 320 meets predetermined specifications, such as for example, that the object 320 has a substantially uniform or constant diameter D1 and D2 at the two selected angles to verify part eccentricity.

Figure 5:
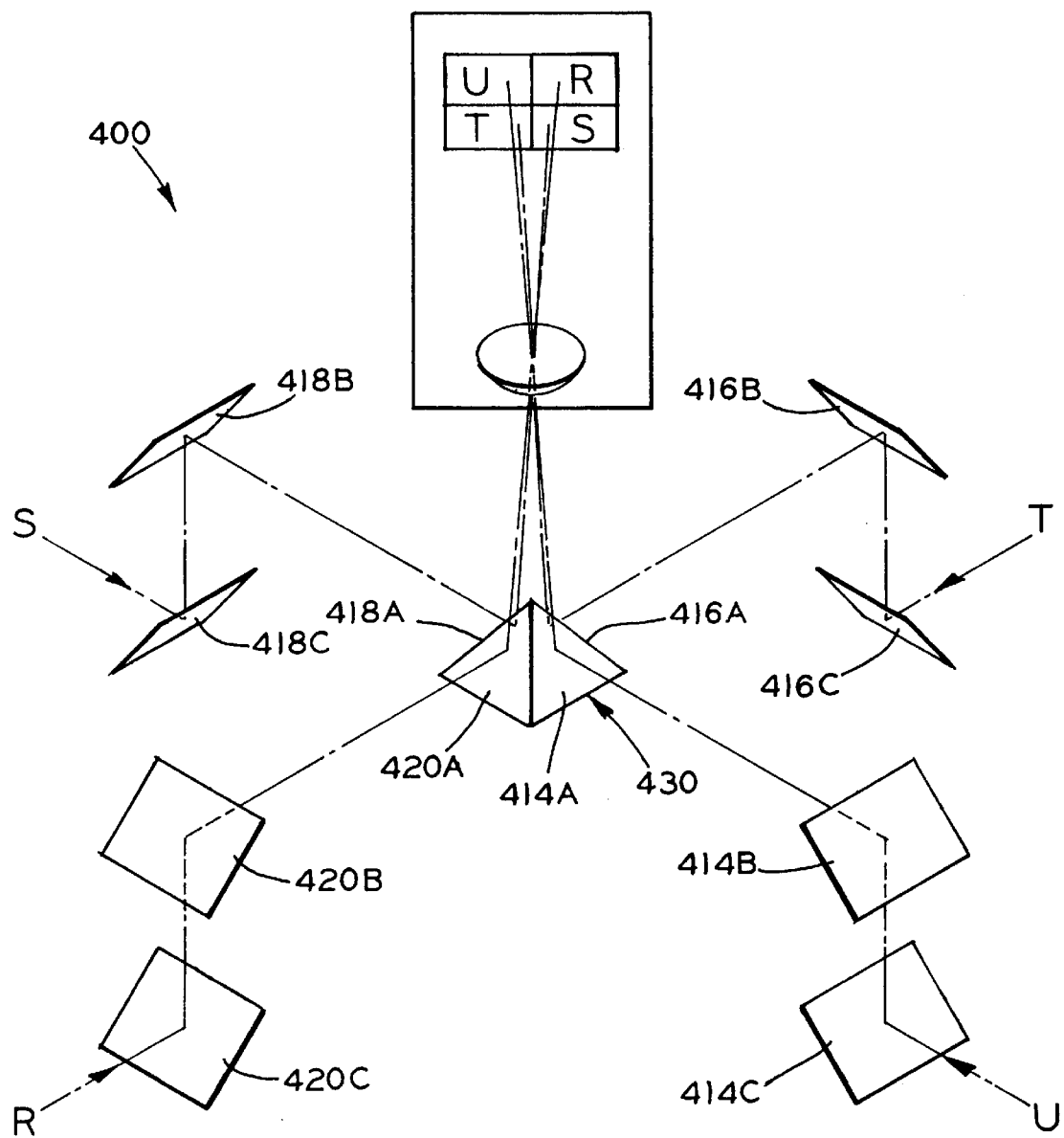
FIG. 5 is a schematic diagram illustrating a fifth embodiment of an optical image field splitting system in accordance with this invention, the system being used to provide for four different view paths.

Referring now to FIG. 5, there is illustrated a fifth embodiment of an optical image field splitting system, indicated generally at 400, in accordance with the present invention. As shown therein, the optical image field splitting system 400 is an adjustable multi-view optical image field splitting system and includes a camera 412, mirrors 414A, 414B, 414C, 416A, 416B, 416C, 418A, 418B, 418C, 420A, 420B, and 420C, and objects "R", "S", "T", and "U". In the illustrated embodiment, the mirrors 414A, 416A, 418A, and 420A define a four-sided pyramid shaped mirror 430 to so as to provide a "four field" adjustable optical image field splitting system 400 capable of producing four different view paths to view four different objects R, S, T, and U as illustrated. Such an optical image field splitting system 400 can be adapted to allow a single camera to simultaneously acquire views of four different participants of a video conference. Alternatively, the four field adjustable optical image field splitting system 400 can be used other than illustrated. For example, the four field adjustable optical image field splitting system 400 could be used to produce four different views of a single object, two different views of two different objects, three different views of one object and one view of another object. Alternatively, a four field system can be achieved using two orthogonal mirror pairs stacked one above the other and with a ninety degree offset between them in terms of rotation about the vertical axis.

One advantage of the optical image field splitting system of this invention is that it allows infinite adjustment of the position and direction of the desired images or object scenes, and that it allows infinite adjustment of the position and direction of the desired object scenes without altering the angular field of view of any scene. Also, the optical image field splitting system of this invention allows infinite adjustment of the position and direction of the desired object scenes without changing the optical path length from object to image. In addition, the optical image field splitting system of this invention allows easy and rapid mounting to existing lenses of all types with a simple change in the thread or other similar connection of a lens adapter. This avoids the complication and expense of custom built fixtures for other components as well as allowing a higher degree of portability. Furthermore, the optical image field splitting system of this invention is able to produce an infinitely adjustable optical field splitter with no change in optical path length or reduction of the angular field of view.

Although the invention has been described and illustrated in connection with the particular optical image field splitting systems disclosed and illustrated herein, it will be appreciated that this invention may be used in connection with other optical image field splitting systems.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. An optical image field splitting system with a camera having a lens comprising:

a mirror pair including a first mirror defining a first reflective planar surface and a second mirror defining a second reflective planar surface, said first reflective planar surface being oriented at a first predetermined angle relative to said second reflective planar surface;

a third mirror spaced apart from said second mirror of said mirror pair, said third mirror defining a third reflective planar surface oriented at a second predetermined angle relative to said second reflective surface of said second mirror, wherein said mirror pair disposed in an optical path defined between said camera and said third mirror;

a predetermined optical path length defined between said third mirror and said second mirror; and means for effecting selective rotation of said third mirror relative to said second mirror without changing said predetermined optical path length.

* * * * *